(12) United States Patent
Yoshimura et al.

(10) Patent No.: US 11,339,813 B2
(45) Date of Patent: May 24, 2022

(54) JOINT STRUCTURE

(71) Applicant: SUBARU CORPORATION, Tokyo (JP)

(72) Inventors: Kensuke Yoshimura, Tokyo (JP); Naoyuki Sekine, Tokyo (JP); Masakatsu Abe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 177 days.

(21) Appl. No.: 16/688,822

(22) Filed: Nov. 19, 2019

(65) Prior Publication Data

US 2020/0224687 A1 Jul. 16, 2020

(30) Foreign Application Priority Data

Jan. 11, 2019 (JP) .............................. JP2019-003696

(51) Int. Cl.
*F16B 5/00* (2006.01)

(52) U.S. Cl.
CPC .................................. *F16B 5/0012* (2013.01)

(58) Field of Classification Search
CPC ......... B29C 66/1122; B64C 1/26; B64C 3/26; F16B 5/0008; F16B 5/0012; F16B 11/00; F16B 11/006; F16B 17/008; F16C 3/026; F16C 7/026; Y10T 403/47; Y10T 403/473; Y10T 403/65; Y10T 403/70; Y10T 403/7039; Y10T 403/7073; Y10T 403/76
USPC ........ 156/293; 403/265, 268, 339, 345, 361, 403/375, 709.1
See application file for complete search history.

(56) References Cited

U.S. PATENT DOCUMENTS

| | | | |
|---|---|---|---|
| 2,267,330 A * | 12/1941 | Goss | .......................... E04C 2/12 403/265 |
| 4,695,502 A | 9/1987 | Rush | |
| 5,205,895 A | 4/1993 | Hohman, Jr. et al. | |
| 5,613,794 A * | 3/1997 | Isaac | ....................... F16C 7/026 403/265 |
| 7,574,835 B2 * | 8/2009 | Bohlmann | ................ B32B 1/00 156/293 |
| 7,998,303 B2 * | 8/2011 | Baehmann | .......... B29C 66/1122 156/293 |
| 8,342,598 B2 * | 1/2013 | Stanton | ................ B62D 33/046 296/191 |

(Continued)

FOREIGN PATENT DOCUMENTS

| | | |
|---|---|---|
| DE | 32 21 797 A1 | 12/1983 |
| DE | 33 41 929 A1 | 5/1985 |

(Continued)

OTHER PUBLICATIONS

Extended European Search Report dated May 15, 2020 for European Patent Application No. 19213210.8-1010.

(Continued)

*Primary Examiner* — Josh Skroupa
(74) *Attorney, Agent, or Firm* — McGinn I.P. Law Group, PLLC.

(57) ABSTRACT

A joint structure includes a first member having a fit-in groove, a second member made of a material different from a material of the first member and having an insertion section to be inserted into the fit-in groove, and a plurality of bonding layers having different hardness and formed between the fit-in groove and the insertion section.

19 Claims, 4 Drawing Sheets

(56) References Cited

U.S. PATENT DOCUMENTS

| | | | |
|---|---|---|---|
| 9,931,809 B2* | 4/2018 | Kosugi | B29C 66/1122 |
| 10,029,780 B2* | 7/2018 | Ross | B64C 3/26 |
| 10,137,640 B2* | 11/2018 | Godon | F16B 11/006 |
| 2015/0024160 A1 | 1/2015 | Georgeson et al. | |
| 2017/0066216 A1 | 3/2017 | Kosugi et al. | |

FOREIGN PATENT DOCUMENTS

| | | |
|---|---|---|
| DE | 10 2010 055 949 A1 | 6/2012 |
| EP | 0906994 A1 | 4/1999 |
| JP | 2017-052183 A | 3/2017 |

OTHER PUBLICATIONS

Extended European Search Report dated Jan. 19, 2022 in European Application No. 21201440.1.
Extended European Search Report dated Feb. 23, 2022 in European Application No. 21201411.2.

* cited by examiner

JOINT STRUCTURE

CROSS-REFERENCE TO RELATED APPLICATIONS

The present application claims priority from Japanese Patent Application No. 2019-003696 filed on Jan. 11, 2019, the entire contents of which are hereby incorporated by reference.

BACKGROUND

The disclosure relates to joint structures.

For example, according to Japanese Unexamined Patent Application Publication No. 2017-052183, in building an aircraft or the like, a first member made of a fiber reinforced plastic or the like and a second member made of a metallic material are coupled together. In this case, an insertion section formed on the second member is inserted into a fit-in groove formed in the first member. The first member and the second member are bonded together by an adhesive applied to the inner wall surface of the fit-in groove and the outer surface of the insertion section.

SUMMARY

An aspect of the disclosure provides a joint structure including a first member having a fit-in groove, a second member made of a material different from a material of the first member and having an insertion section to be inserted into the fit-in groove, and a plurality of bonding layers having different hardness and formed between the fit-in groove and the insertion section.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Besides members constituting an aircraft, in bonding between members composed of different types of materials, such as bonding between the first and second members described above, the strength decreases due to cracks generated in a bonding layer by the difference in the amount of deformation between the members having different stiffness.

It is desirable to provide a joint structure that can suppress a decrease in strength.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
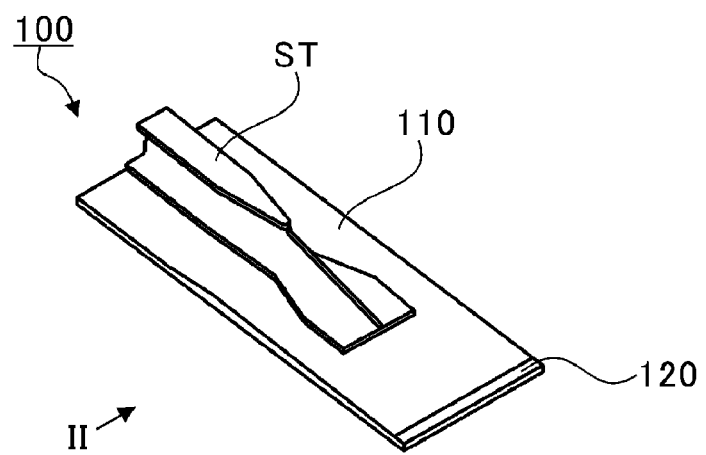
FIG. 1 is a perspective view of a joint structure provided on members constituting an aircraft.

FIG. 1 is a perspective view of a joint structure 100 provided on members constituting an aircraft. Herein, an example of a first member 110 is a skin that constitutes the main wings of an aircraft and to which a stringer ST is attached. An example of a second member 120 is a member that constitutes the fuselage of an aircraft and that is joined to the skin. FIG. 1 illustrates only a portion of the second member 120 adjacent to the first member 110. The first member 110 and the second member 120 are, for example, substantially plate-shaped. The first member 110 and the second member 120 may be other members constituting an aircraft or may be members constituting a system other than an aircraft.

The first member 110 is made of, for example, a fiber reinforced plastic (FRP). The second member 120 is made of, for example, a titanium alloy. The first member 110 and the second member 120 may be made of other materials, as long as they are made of different materials.

Figure 2:
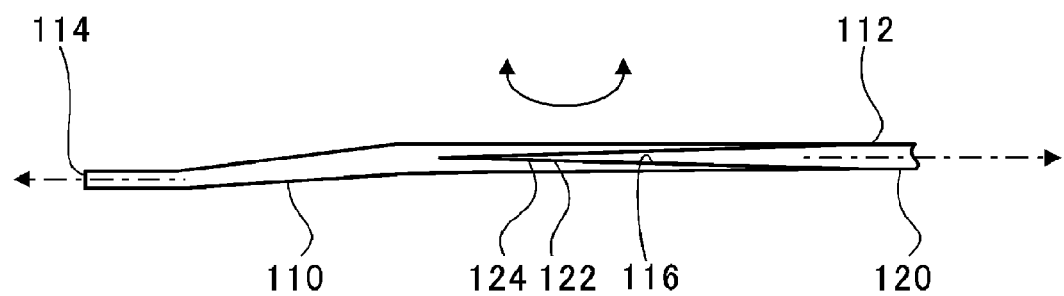
FIG. 2 illustrates the joint structure in FIG. 1, as viewed in the direction of arrow II.

FIG. 2 illustrates the joint structure in FIG. 1, as viewed in the direction of arrow II. FIG. 2 does not illustrate the stringer ST. As illustrated in FIG. 2, the first member 110 has one end 112 and the other end 114 in the left-right direction, and the position of the other end 114 is shifted downward (i.e., offset) with respect to the position of the one end 112. The first member 110 has a fit-in groove 116 at the one end 112.

An insertion section 124 is formed at an end 122 of the second member 120, on the same side as the other end 114 of the first member 110. The insertion section 124 is formed so as to fit in the fit-in groove 116. The insertion section 124 is inserted into the fit-in groove 116. Hereinbelow, the direction in which the second member 120 is inserted into the first member 110 will be simply referred to as an insertion direction (i.e., the left-right direction in FIG. 2).

Let us assume that the first member 110 and the second member 120 are pulled away from each other in the insertion direction, as indicated by one-dot chain line arrows in FIG. 2.

In this case, because the positions of the one end 112 and the other end 114 of the first member 110 are shifted from each other as described above, the tensile loads acting on the first member 110 and the second member 120 are also not on the same axis and are shifted from each other (i.e., offset load). As a result, a bending moment acts near the fit-in groove 116 and the insertion section 124, as indicated by a double-sided arrow in FIG. 2.

Figure 3:
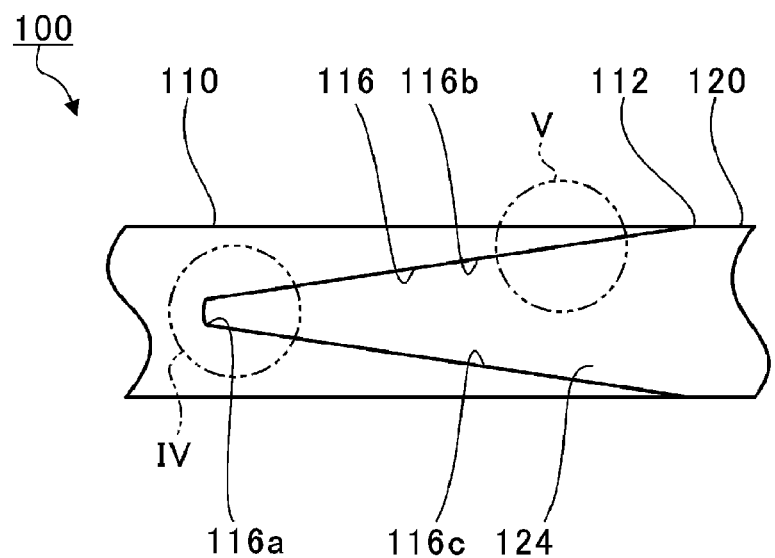
FIG. 3 illustrates a fit-in groove and an insertion section.

FIG. 3 illustrates the fit-in groove 116 and the insertion section 124. In FIGS. 3 to 8, the ratio of the vertical dimension relative to the horizontal dimension is increased compared with that in FIG. 2, so that the relevant part can be easily viewed.

As illustrated in FIG. 3, the joint structure 100 employs a scarf joint. The fit-in groove 116 and the insertion section 124 extend in the depth direction in FIG. 3. The fit-in groove 116 has a deepest section 116a, a first inner wall surface 116b, and a second inner wall surface 116c.

The deepest section 116a is located at the deepest position in the fit-in groove 116. The first inner wall surface 116b and the second inner wall surface 116c are disposed above and below the deepest section 116a in FIG. 3. The first inner wall surface 116b is located on one side (i.e., the upper side in FIG. 3), and the second inner wall surface 116c is located on the other side (i.e., the lower side in FIG. 3) of the deepest section 116a.

The first inner wall surface 116b and the second inner wall surface 116c are disposed so as to be closer to each other from the one end 112 toward the deepest section 116a of the first member 110. In other words, the fit-in groove 116 is tapered toward the deepest section 116a.

A bonding layer (not illustrated in FIG. 3) is formed between the fit-in groove 116 and the insertion section 124. The first member 110 and the second member 120 are bonded together by the bonding layer. Similarly to the fit-in groove 116 and the insertion section 124, the bonding layer also extends in the depth direction in FIG. 3.

Figure 4:
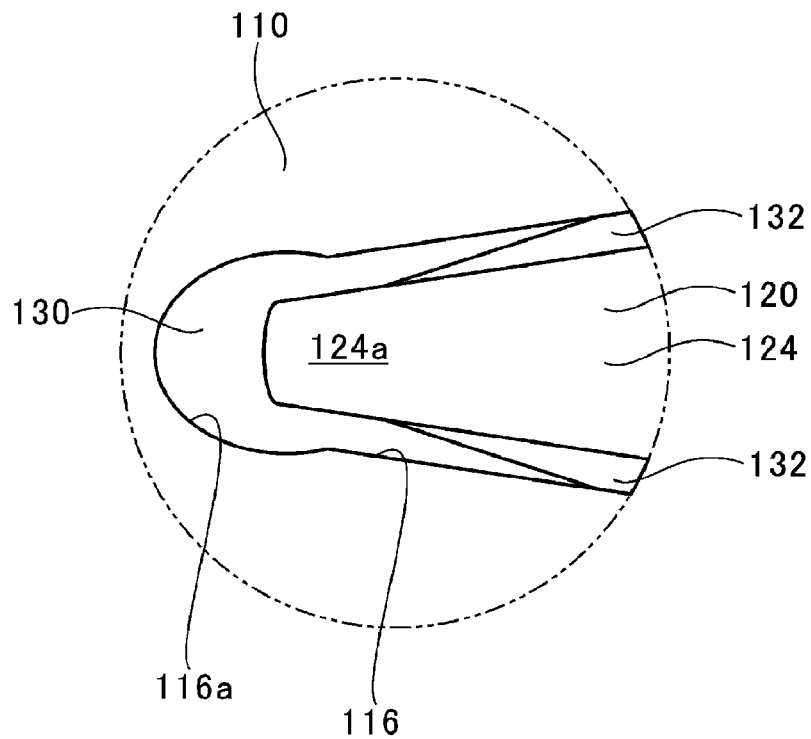
FIG. 4 illustrates an encircled portion IV in FIG. 3.

FIG. 4 illustrates an encircled portion IV in FIG. 3. As illustrated in FIG. 4, bonding layers 130 and 132 are formed between the fit-in groove 116 and the insertion section 124. The bonding layer 130 is formed between the deepest section 116a of the fit-in groove 116 and the distal end 124a of the insertion section 124. The bonding layer 130 is disposed so as to extend away from the deepest section 116a, toward the distal end 124a.

The bonding layer 132 is disposed further away from the deepest section 116a than the bonding layer 130 is. For example, the bonding layer 132 is formed so as to be continuous with the bonding layer 130. However, the bonding layer 132 may be separated from the bonding layer 130.

The bonding layer 130 is softer than the bonding layer 132; that is, the bonding layer 130 is more easily deformed than the bonding layer 132. The bonding layer 130 allows for a greater amount of (non-destructive) deformation than the bonding layer 132.

In bonding between members composed of different types of materials, the strength (particularly, the fatigue strength) decreases due to cracks generated in the bonding layer by the difference in the amount of deformation between the first member 110 and the second member 120, which have different stiffness. The cracks tend to occur between the deepest section 116a of the fit-in groove 116 and the distal end 124a of the insertion section 124. By disposing the soft bonding layer 130 in this part, the occurrence and progress of the cracks are suppressed, thus suppressing a decrease in strength.

Figure 5:
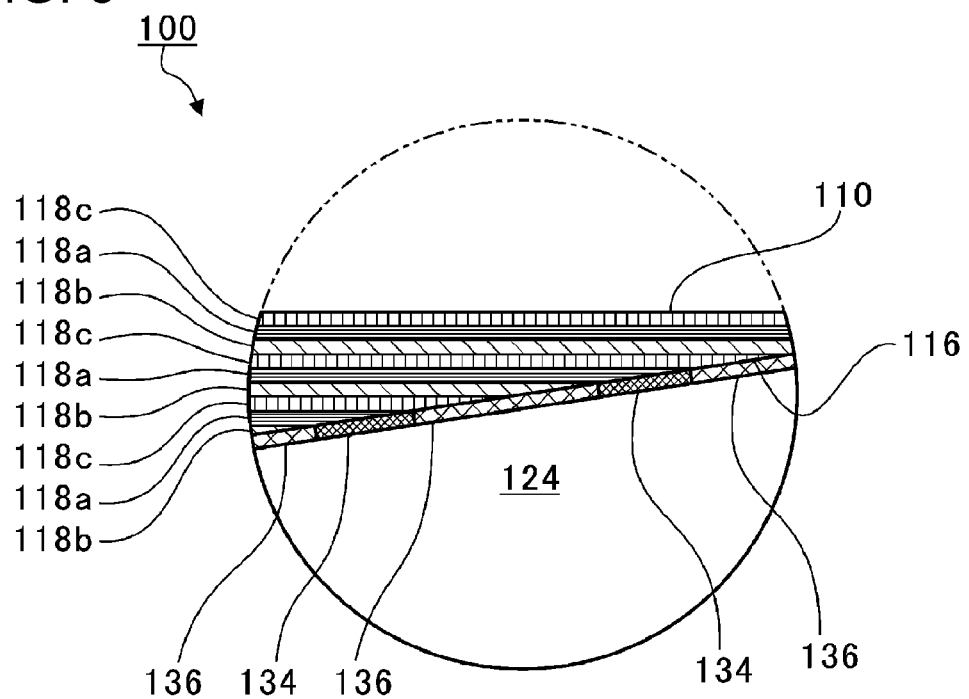
FIG. 5 illustrates an encircled portion V in FIG. 3.

FIG. 5 illustrates an encircled portion V in FIG. 3. As illustrated in FIG. 5, the first member 110 includes a plurality of fiber-containing layers 118a, 118b, and 118c composed of a fiber reinforced plastic (composite material). The drawings other than FIG. 5 do not illustrate the fiber-containing layers 118a, 118b, and 118c. The direction in which fibers extend (hereinbelow, fiber extending direction) in the fiber-containing layers 118a is almost parallel to the insertion direction. The fiber extending direction of the fiber-containing layers 118b is inclined at substantially 45 degrees with respect to the insertion direction. The fiber extending direction of the fiber-containing layers 118c is substantially perpendicular to the insertion direction.

Bonding layers 134 and 136 are formed between the fit-in groove 116 and the insertion section 124. The bonding layers 134 are bonded to the fiber-containing layers 118a. The bonding layers 136 are bonded to the fiber-containing layers 118b and 118c. The bonding layers 134 are harder than the bonding layers 136.

The joint structure 100 includes at least one portion where the combinations of the bonding layers 134 and 136 and the fiber-containing layers 118a, 118b, and 118c, which are bonded to each other, are as those illustrated in FIG. 5.

Herein, for example, the bonding layer/fiber-containing layer combinations are as those illustrated in FIG. 5 over the entire fit-in groove 116, except for the vicinity of the deepest section 116a illustrated in FIG. 4.

The fiber-containing layers 118a have a higher strength against the tensile load applied in the insertion direction than the fiber-containing layers 118b and 118c. By bonding the hard bonding layers 134 to the fiber-containing layers 118a, a sufficient bonding strength is ensured. The soft bonding layers 136 bonded to the fiber-containing layers 118b and 118c reduce vibration and impacts.

Figure 6:
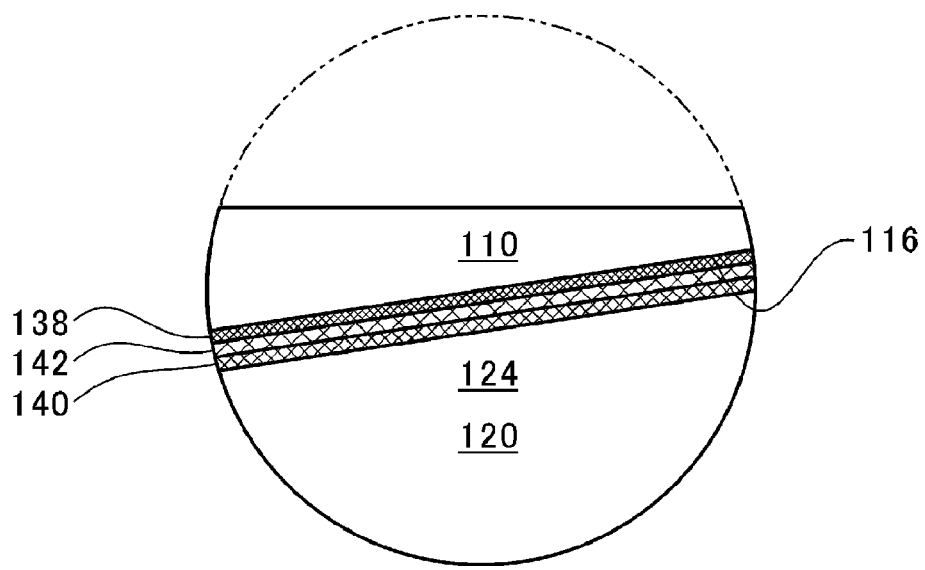
FIG. 6 illustrates a first modification.

FIG. 6 illustrates a first modification. FIG. 6 illustrates a portion corresponding to FIG. 5 in the first modification. As illustrated in FIG. 6, bonding layers 138, 140, and 142 are formed between the fit-in groove 116 and the insertion section 124. The bonding layer 138 (first layer) is bonded to the first member 110. The bonding layer 140 (second layer) is bonded to the second member 120. The bonding layer 142 (third layer) is formed between and is bonded to the bonding layers 138 and 140. The bonding layer 142 is softer than the bonding layers 138 and 140.

The bonding layer 138 has a higher peel strength when bonded to the first member 110 than when bonded to the second member 120. The bonding layer 140 has a higher peel strength when bonded to the second member 120 than when bonded to the first member 110.

Hence, the bonding layer 138 is securely bonded to the first member 110, and the bonding layer 140 is securely bonded to the second member 120. In addition, a large amount of allowable deformation is ensured by the soft bonding layer 142.

Figure 7:
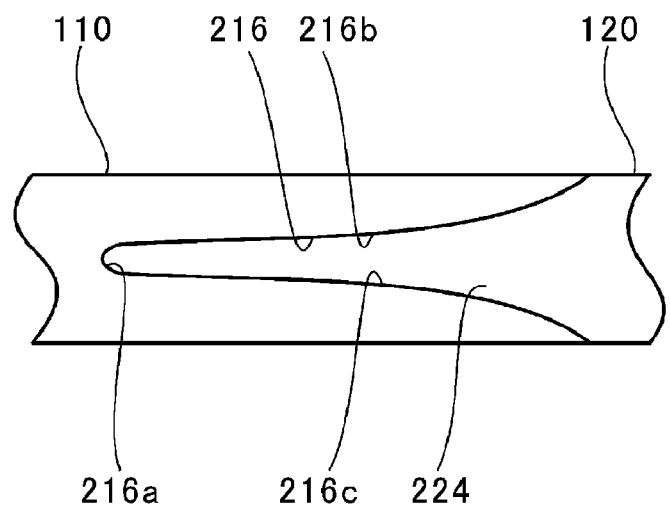
FIG. 7 illustrates a second modification.

FIG. 7 illustrates a second modification. FIG. 7 illustrates a portion corresponding to FIG. 3 in the second modification. Herein, the bonding layers are not illustrated. As illustrated in FIG. 7, in the second modification, a first inner wall surface 216b (inner wall surface) and a second inner wall surface 216c (inner wall surface) of a fit-in groove 216 are curved so as to be more parallel to the insertion direction toward a deepest section 216a. In other words, the first inner wall surface 216b and the second inner wall surface 216c are curved so as to be closer to each other at the intermediate portions thereof in the insertion direction. An insertion section 224 is formed so as to fit into the fit-in groove 216.

In bonding between members composed of different types of materials, strain in the bonding layers concentrates near the deepest section 216a due to the difference in the amount of deformation between the first member 110 and the second member 120, which have different stiffness. This causes the occurrence and progress of cracks in the bonding layers. The curved first inner wall surface 216b and second inner wall surface 216c suppress the concentration of strain in the bonding layers, near the deepest section 216a. Thus, the occurrence and progress of the cracks in the bonding layers are suppressed, thus suppressing a decrease in strength.

Figure 8:
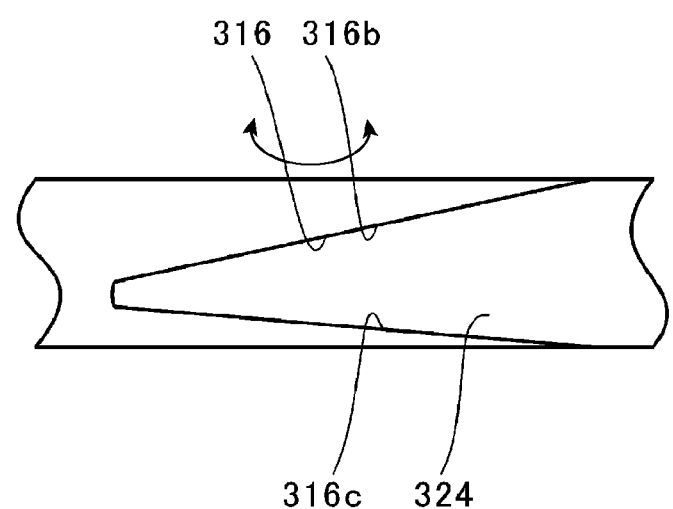
FIG. 8 illustrates a third modification.

FIG. 8 illustrates a third modification. FIG. 8 illustrates a portion corresponding to FIG. 3 in the third modification. Herein, the bonding layers are not illustrated. As illustrated in FIG. 8, in the third modification, a second inner wall surface 316c of a fit-in groove 316 is more parallel to the insertion direction than a first inner wall surface 316b is.

Specifically, the second inner wall surface 316c is inclined at a smaller angle with respect to the insertion direction than the first inner wall surface 316b. An insertion section 324 is formed so as to fit into the fit-in groove 316.

As described above, a bending moment as indicated by a double-sided arrow in FIG. 8 acts near the fit-in groove 316 and the insertion section 324. Due to this bending moment, mainly tensile stress acts on the second inner wall surface 316c side, and mainly a compressive stress acts on the first inner wall surface 316b side.

Because the inclination angle of the second inner wall surface 316c with respect to the insertion direction is small, the ratio of shearing stress acting on the second inner wall surface 316c is small, and the ratio of tensile stress is large. The bonding layer between the second inner wall surface 316c and the insertion section 324 has a high stiffness against tensile stress.

Because the inclination angle of the first inner wall surface 316b with respect to the insertion direction is large, the ratio of shearing stress acting on the first inner wall surface 316b is larger than that on the second inner wall surface 316c. Hence, the amount of deformation due to shearing is large on the first inner wall surface 316b side.

As described above, in the third modification, while ensuring a high stiffness on the second inner wall surface 316c side, deformation is allowed on the first inner wall surface 316b side. This configuration makes it possible to suppress the occurrence and progress of cracks, and thus, to suppress a decrease in strength.

Although the preferred embodiment of the disclosure has been described with reference to the attached drawings, the disclosure is of course not limited to the embodiment. It is obvious to those skilled in the art that various changes and modifications can be made within the scope of the claims, and such changes and modifications are also within the technical scope of the disclosure.

For example, in the above-described embodiment and modifications, a configuration has been described in which the first member 110 is made of a fiber reinforced plastic, and the second member 120 is made of a titanium alloy. However, it is also possible that the first member 110 is made of a titanium alloy, and the second member 120 is made of a fiber reinforced plastic. The first member 110 may be a member that constitutes the fuselage of an aircraft and that is joined to the skin, and the second member 120 may be the skin that constitutes the main wings of an aircraft and to which a stringer ST is attached. Furthermore, a composite material other than a fiber reinforced plastic may be used.

Furthermore, in the above-described embodiment and modifications, a configuration has been described in which, among the plurality of bonding layers, the bonding layer 130, which is softer than another bonding layer 132, is disposed between the deepest sections 116a and 216a of the fit-in grooves 116, 216, and 316 and the distal ends 124a of the insertion sections 124, 224, and 324. However, this configuration is not mandatory.

Furthermore, in the above-described embodiment and modifications, a configuration has been described in which: the first member 110 includes the plurality of fiber-containing layers 118a, 118b, and 118c; and the joint structure 100 includes a portion in which the bonding layers 134 bonded to the fiber-containing layers 118a, whose fiber extending direction is parallel to the insertion direction, are harder than the bonding layers 136 bonded to the fiber-containing layers 118b and 118d, whose fiber extending directions are different from the insertion direction. However, it is also possible not to provide such a portion.

Furthermore, the soft bonding layers 130 and 136 may be made of the same adhesive or may have different hardness. The soft bonding layers 130 and 142 may be made of the same adhesive or may have different hardness. The hard bonding layers 132 and 134 may be made of the same adhesive or may have different hardness. The hard bonding layers 132, 138, and 140 may be made of the same adhesive or may have different hardness.

Furthermore, in the above-described second and third modifications, the plurality of bonding layers having different hardness do not have to be formed between the fit-in grooves 216 and 316 and the insertion sections 224 and 324. Even in that case, the above-described advantages are obtained by the shapes of the fit-in grooves 216 and 316 and the insertion sections 224 and 324, and thus, a decrease in strength can be suppressed.

The invention claimed is:

1. A joint structure comprising:
a first member having a fit-in groove;
a second member made of a material different from a material of the first member and comprising an insertion section to be inserted into the fit-in groove; and
a plurality of bonding layers having different hardness and formed between the fit-in groove and the insertion section, wherein
the plurality of bonding layers includes a first bonding layer and a second bonding layer that is harder than the first bonding layer,
an entirety of a first portion between a section of the fit-in groove and a distal end of the insertion section is filled with the first bonding layer so that the first bonding layer is bonded to both the deepest section of the fit-in groove and the distal end of the insertion section at the first portion, and
an entirety of a second portion including a disposed further away from the deepest section than the first portion along an insertion direction of the insertion section to the fit-in groove is filled with the second bonding layer so that the second bonding layer is bonded to both the fit-in groove and the insertion section.

2. The joint structure according to claim 1, wherein
either one of the first member and the second member comprises a plurality of fiber-containing layers made of composite materials having different fiber extending directions, and
the joint structure includes a third portion in which the bonding layer bonded to the fiber-containing layer, among the plurality of fiber-containing layers, whose fiber extending direction is parallel to the insertion direction of the insertion section is harder than the bonding layer bonded to the fiber-containing layer, among the plurality of fiber-containing layers, whose fiber extending direction is different from the insertion direction, wherein the third portion includes one or more parts located farther from the deepest section of the fit-in groove than the first portion along an insertion direction of the insertion section.

3. The joint structure according to claim 2, wherein the plurality of bonding layers include a first layer to be bonded to the first member, a second layer to be bonded to a second member, and a third layer that is softer than the first and second layers and that is to be disposed between the first and second layers.

4. The joint structure according to claim 3, wherein the fit-in groove comprises inner wall surfaces that are curved so as to be more parallel to the insertion direction of the insertion section toward the deepest section.

5. The joint structure according to claim 3, wherein the fit-in groove has a first inner wall surface on one side of the deepest section and a second inner wall surface on the other side of the deepest section, the second inner wall surface being more parallel to the insertion direction of the insertion section than the first inner wall surface is.

6. The joint structure according to claim 2, wherein the fit-in groove comprises inner wall surfaces that are curved so as to be more parallel to the insertion direction of the insertion section toward the deepest section.

7. The joint structure according to claim 2, wherein the fit-in groove has a first inner wall surface on one side of the deepest section and a second inner wall surface on the other side of the deepest section, the second inner wall surface being more parallel to the insertion direction of the insertion section than the first inner wall surface is.

8. The joint structure according to claim 1, wherein the plurality of bonding layers include a first layer to be bonded to the first member, a second layer to be bonded to a second member, and a third layer that is softer than the first and second layers and that is to be disposed between the first and second layers.

9. The joint structure according to claim 8, wherein the fit-in groove comprises inner wall surfaces that are curved so as to be more parallel to the insertion direction of the insertion section toward the deepest section.

10. The joint structure according to claim 8, wherein the fit-in groove has a first inner wall surface on one side of the deepest section and a second inner wall surface on the other side of the deepest section, the second inner wall surface being more parallel to the insertion direction of the insertion section than the first inner wall surface is.

11. The joint structure according to claim 1, wherein the fit-in groove comprises inner wall surfaces that are curved so as to be more parallel to the insertion direction of the insertion section toward the deepest section.

12. The joint structure according to claim 1, wherein the fit-in groove has a first inner wall surface on one side of the deepest section and a second inner wall surface on the other side of the deepest section, the second inner wall surface being more parallel to the insertion direction of the insertion section than the first inner wall surface is.

13. The joint structure according to claim 1, further comprising a connecting portion coupled with both the first portion and the second portion and comprising the first bonding layer and the second bonding layer, wherein the first bonding layer, in the connecting portion, is thinner as further away from the deepest section along the insertion direction of the insertion section.

14. The joint structure according to claim 13, wherein the fit-in groove comprises inner wall surfaces that are curved so as to be more parallel to the insertion direction of the insertion section toward the deepest section.

15. The joint structure according to claim 13, wherein the fit-in groove has a first inner wall surface on one side of the deepest section and a second inner wall surface on the other side of the deepest section, the second inner wall surface being more parallel to the insertion direction of the insertion section than the first inner wall surface is.

16. The joint structure according to claim 13, wherein in the connecting portion, the first bonding layer is bonded to the fit-in groove and the second bonding layer is bonded to the insertion section.

17. A joint structure comprising:
a first member having a fit-in groove;
a second member made of a material different from a material of the first member and comprising an insertion section to be inserted into the fit-in groove; and
a plurality of bonding layers having different hardness and formed between the fit-in groove and the insertion section, wherein
either one of the first member and the second member comprises a plurality of fiber-containing layers made of composite materials having different fiber extending directions, and
the joint structure includes a portion in which the bonding layer bonded to the fiber-containing layer, among the plurality of fiber-containing layers, whose fiber extending direction is parallel to an insertion direction of the insertion section is harder than the bonding layer bonded to the fiber-containing layer, among the plurality of fiber-containing layers, whose fiber extending direction is different from the insertion direction.

18. The joint structure according to claim 17, wherein the fit-in groove comprises inner wall surfaces that are curved so as to be more parallel to the insertion direction of the insertion section toward the deepest section.

19. The joint structure according to claim 17, wherein the fit-in groove has a first inner wall surface on one side of the deepest section and a second inner wall surface on the other side of the deepest section, the second inner wall surface being more parallel to the insertion direction of the insertion section than the first inner wall surface is.

* * * * *